United States Patent
Mikura et al.

(10) Patent No.: US 8,444,164 B2
(45) Date of Patent: May 21, 2013

(54) WHEEL SPEED SENSOR MOUNTING STRUCTURE

(75) Inventors: Keita Mikura, Wako (JP); Kenji Kofuji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/543,401

(22) Filed: Jul. 6, 2012

(65) Prior Publication Data

US 2013/0026731 A1    Jan. 31, 2013

(51) Int. Cl.
  *B62K 19/00*    (2006.01)
(52) U.S. Cl.
  USPC .......................................................... 280/279
(58) Field of Classification Search
  USPC ................................................ 280/279, 276
  See application file for complete search history.

(56) References Cited

FOREIGN PATENT DOCUMENTS

JP    2010-270888 A    12/2010

*Primary Examiner* — Tashiana Adams
(74) *Attorney, Agent, or Firm* — Birch, Stewart, Kolasch & Birch, LLP

(57) ABSTRACT

A pulsar ring includes a portion to be detected and a pulsar ring mounting portions that project in a radially outward direction from an outer peripheral portion of the portion to be detected. The portion to be detected and a pulsar ring mounting portion are arranged so as to form continuous planar surfaces. The pulsar ring is rigidly mounted on a mounting boss of a wheel using a bolt by fastening a brake disc wherein the pulsar ring overlaps with the brake disc mounting portion. Even when the brake disc thermally deforms at the time of braking so that the pulsar ring mounting portion is pulled radially outwardly, the portion to be detected and the pulsar ring mounting portion are arranged on the same plane thus forming the continuous planar surfaces. Thus, the portion to be detected is hardly twisted with hardly any deformation of the portion to be detected.

20 Claims, 6 Drawing Sheets

WHEEL SPEED SENSOR MOUNTING STRUCTURE

CROSS-REFERENCE TO RELATED APPLICATIONS

The present application claims priority under 35 USC 119 to Japanese Patent Application No. 2011-167898 filed Jul. 31, 2011 the entire contents of that are hereby incorporated by reference.

BACKGROUND OF THE INVENTION

1. Field of the Invention

The present invention relates to the wheel speed sensor mounting structure. More particularly, to the wheel speed sensor mounting structure where a pulsar ring that constitutes a part of the wheel speed sensor is rigidly mounted on a wheel by fastening together with a brake disc. The pulsar ring is hardly deformed even when the brake disc is thermally deformed due to special braking.

2. Description of Background Art

A brake disc for a disc brake and a pulsar ring that constitutes a part of a wheel speed sensor are known wherein the members are mounted on a wheel of a motorcycle or the like by fastening.

The wheel speed sensor is provided for measuring a wheel speed that is necessary for controlling an ABS (Antilock Brake System) or the like. The wheel speed sensor includes a pulsar ring that is rotated integrally with a wheel, and a sensor body portion that generates pulse signals corresponding to a rotational speed of the pulsar ring.

A conventional example of a motorcycle that mounts such a pulsar ring thereon is disclosed, for example, in JP-A-2010-270888. In this conventional example, a brake-use brake disc and a pulsar ring are fixed to a wheel of a motorcycle by fastening the brake disc and the pulsar ring together to a boss mounted on spokes. The brake-use brake disc is fastened to the boss by way of a stepped collar. A disc spring for a floating mount is arranged between the stepped collar and the brake disc. An accommodation recessed portion for accommodating a bolt head therein is formed on the stepped collar so as to prevent the bolt head of the bolt that fastens the brake disc and the pulsar ring together from largely projecting outwardly.

Due to such a construction, both the brake disc and the pulsar ring can be mounted on the wheel in a compact size.

Further, by adopting the above-mentioned floating mount, a stable positional relationship can be maintained between the sensor body portion and the pulsar ring.

More specifically, the brake disc is raised to a high temperature due to friction generated between the brake disc and a brake caliper at the time of braking a vehicle so that the brake disc is thermally expanded. Due to such thermal expansion, the brake disc is deformed so that the pulsar ring that is fastened to the wheel together with the brake disc is also deformed. As a result, there exists a possibility that the positional relationship between the sensor body portion that is fixed to a vehicle body side and the pulsar ring that is mounted on a wheel side in an integrally rotatable manner is changed.

However, due to the above-mentioned floating mount structure, only the brake disc simply extends in the radial direction and the pulsar ring is not deformed by thermal expansion of the brake disc. Thus, a stable positional relationship can be maintained between the sensor body portion and the pulsar ring.

This maintaining of the stable positional relationship is required for maintaining high wheel-speed detection accuracy.

Further, as shown in FIG. 10 and FIG. 11, a known the brake disc fastening structure is illustrated where a brake disc and a pulsar ring are rigidly mounted on a wheel without adopting the above-mentioned floating mount structure. The rigid mount structure is required for reducing the number of parts and for realizing the reduction of cost compared to the floating mount structure. In FIG. 10, a disc-brake-use brake disc 104 and a pulsar ring 120 are fixed to a wheel 101 of a motorcycle in a state where the brake disc 104 and the pulsar ring 120 are fastened together to a boss 150 that is formed on spokes 108. The brake disc 104 includes an annular braking portion 104*a* and a brake-disc-side mounting portion 104*b* that are formed on an inner peripheral portion of the braking portion 104*a*. Through holes 140 are formed in the brake-disc-side mounting portion 104*b*.

FIG. 11 is a perspective view of the pulsar ring 120. The pulsar ring 120 includes a portion 121 that is detected by a sensor body portion 131, and pulsar-ring-side mounting portions 123 that project in the radially outward direction from an outer peripheral portion of the portion to be detected 121. Detection holes 122 are formed in the portion to be detected 121 over the whole circumference equidistantly. A flange 126 that is bent inwardly at an approximately right angle is integrally formed on an inner-peripheral-side edge portion of the portion to be detected 121. The flange 126 is continuously formed over the whole circumference of the portion to be detected 121.

The pulsar-ring-side mounting portion 123 is bent at a root portion 123*a* where the pulsar-ring-side mounting portion 123 is joined to the portion to be detected 121 thus forming an inclined portion 123*b* that extends inwardly, that is, in the direction toward the center of rotation C in an inclined manner. The inclined portion 123*b* is folded back in the radially outward direction at an outer folded-back portion 123*c* thus forming a seat portion 125, and a through hole 124 is formed in the seat portion 125. A position of the seat portion 125 is arranged further inside in the direction toward the center of rotation C than a position of a distal end of the flange 126.

The flange 126 plays a role of increasing the rigidity of the whole pulsar ring 120 to a relatively high value together with the pulsar-ring-side mounting portions 123 having the bent structure.

Then, the seat portion 125 is placed on an end surface of the boss 150, the brake-disc-side mounting portion 104*b* of the brake disc 104 overlaps with the seat portion 125, the through holes 124, 140 are aligned with threaded holes 151 formed in the boss 150, and the stepped bolts 110 are fastened to the boss 150. Thus, the brake-disc-side mounting portion 104*b* and the pulsar-ring-side mounting portion 123 are fixed together to the boss 150 by fastening and thereby are rigidly mounted on the boss. The portion to be detected 121 is arranged close to a sensor body portion 131 with a predetermined distance therebetween so that when the portion to be detected 121 is rotated, the detection hole 122 passes an area close to a distal end of the sensor body portion 131.

To consider the case where the above-mentioned rigid mount structure is adopted, in a normal braking operation that is assumed in general traveling, the brake disc 104 is raised to a high temperature (for example, approximately 450° C.) due to friction heat generated mainly at a friction portion thereof with a brake caliper, and thermally expands. Accordingly, the seat portion 125 of the pulsar-ring-side mounting portion 123 is pulled in the radially outward direction by way of the bolt 110. However, as described above, the pulsar ring 120 as a whole has relatively high rigidity. Thus, the pulsar ring 120 can withstand a tensile force that is usually assumed to be generated without being deformed.

Accordingly, the positional relationship between the portion to be detected 121 and the sensor body portion 131 is maintained within a predetermined range even in a rigid mounting state.

On the other hand, at the time of performing a special braking operation, for example, under a special braking state where the brake disc 104 is raised to an extremely high temperature (for example, approximately 600° C. or above) due to extremely continuous braking or the like, there may be a case where the pulsar ring 120 that is rigidly mounted by fastening together with the brake disc 104 is deformed by the thermal expansion of the brake disc 104.

More specifically, when the brake disc 104 that is raised to an extremely high temperature under such a special braking state is largely thermally deformed by the thermal expansion, a large tensile force directed in the radially outward direction is applied to the bolt 110 from the brake disc 104. Accordingly, in the pulsar ring 120 that is rigidly mounted by fastening together with the brake disc 4 using the bolt 110, the seat portion 125 is strongly pulled in the radially outward direction indicated by an arrow A in FIG. 11.

Such a large tensile force acts on the portion 121 from the pulsar-ring-side mounting portion 123 and intends to increase a diameter of the portion 121 to be detected. However, the portion 121 has high rigidity due to the flange 126 formed on the inner-peripheral-side edge portion thereof. Thus, as shown in an enlarged portion in FIG. 11, a resistance force against such a tensile force is generated in an inner peripheral portion of the portion to be detected 121 in the opposite direction, that is, in the radially inward direction as indicated by an arrow D. Further, there exists a difference h in height between the portion to be detected 121 and the seat portion 125 of the pulsar-ring-side mounting portion 123 due to the inclined portion 123b. Thus, the portion 121 to be detected is positioned in an offset manner with respect to the seat portion 125. Accordingly, as indicated by an arrow B, the portion to be detected 121 is twisted due to the bending deformation that makes the portion to be detected 121 inclined inwardly in the direction toward the center of rotation C and thereby a large tensile force generated by the thermal deformation of the brake disc 104 that is raised to an extremely high temperature under a special braking state is absorbed.

When such twisting is generated in the portion to be detected 121, the portion 121 is separated from the sensor body portion 131. Thus, there arises a possibility that the positional relationship between the sensor body portion and the portion to be detected 121 falls outside a predetermined range.

However, in maintaining the high wheel-speed detection accuracy of the wheel speed sensor 130, the positional relationship between the sensor body portion 131 fixed to a vehicle body side and the portion to be detected 121 of the pulsar ring 120 mounted on a wheel 101b side in an integrally rotatable manner is important. Accordingly, there may be a case where it is necessary to maintain such a positional relationship within the predetermined range even under such a special state.

SUMMARY AND OBJECTS OF THE INVENTION

Accordingly, it is an object of an embodiment of the present invention to maintain the above-mentioned wheel-speed detection accuracy by hardly deforming the pulsar ring 120 following the thermal deformation of the brake disc 104 even when the brake disc 104 and the pulsar ring 120 are rigidly mounted together by fastening and also under the above-mentioned special braking state.

To overcome the above-mentioned drawbacks, according to of an embodiment of the present invention, a wheel speed sensor mounting structure includes a fork (5) that rotatably supports a wheel (1b). A brake disc (4) is mounted on a side surface of the wheel (1b) in an integrally rotatable manner and to that braking is applied by a brake caliper (3). A wheel speed sensor (30) is provided for detecting a rotational speed of the wheel (1b). The wheel speed sensor (30) includes a pulsar ring (20) that is rotated integrally with the wheel (1b) and a sensor body portion (31) that is arranged close to an annular portion to be detected (21) formed on the pulsar ring (20) for generating pulse signals corresponding to a rotational speed of the pulsar ring (20). The pulsar ring (20) is mounted on a wheel (1b) side with the sensor body portion (31) being mounted on a fork (5) side. The pulsar ring (20) includes pulsar ring mounting portions (23) that project in the radially outward direction from the portion to be detected (21). The pulsar ring mounting portion (23) is fastened to the side surface of the wheel (1b) together with a brake disc mounting portion (4b) formed on the brake disc (4) using a fastening member (10) in a state where the pulsar ring mounting portion (23) overlaps with the brake disc mounting portion (4b). A seat portion (25) is fastened by the fastening member (10) and the portion (21) to be detected of the pulsar ring mounting portion (23) are arranged on the same plane.

According to an embodiment of the present invention, the pulsar ring (20) includes, as an integral part thereof, a rib (26) that is formed by bending an outer peripheral side edge portion of the portion to be detected (21) along an outer periphery of the portion to be detected (21).

According to an embodiment of the present invention, the structure includes a caliper bracket (12) that is mounted on the fork (5) and supports the caliper (3). The brake disc mounting portion (4b) and the pulsar ring mounting portion (23) are arranged at a position where the brake disc mounting portion (4b) and the pulsar ring mounting portion (23) partially overlap with an inner side of the caliper bracket (12) as viewed in a side view at the time of rotation respectively. An accommodating recessed portion (43) is arranged one step lower than an outer surface of the braking portion (4a) and is formed on the brake disc mounting portion (4b) of the brake disc (4) at a portion of the brake disc mounting portion (4b) that overlaps with the seat portion (25) of the pulsar ring mounting portion (23). The seat portion (25) of the pulsar ring mounting portion (23) is accommodated in the accommodating recessed portion (43).

According to an embodiment of the present invention, the accommodating recessed portion (43) is formed by counterboring, and the accommodating recessed portion (43) is opened toward a side where the pulsar ring (20) is positioned.

According to an embodiment of the present invention, the structure includes the fork (5) that mounts the caliper bracket (12) as a member of the vehicle body side and a brake hose (18) that extends upwardly from the brake caliper (3) behind the fork (5). The brake caliper (3) is arranged behind the fork (5) as viewed in a side view with the sensor body portion (31) being arranged between the fork (5) and the brake caliper (3). A sensor cable (33), that is connected to the sensor body portion (31), extends upwardly inside the brake caliper (3) in the vehicle widthwise direction from the sensor body portion (31) along the fork (5), is supported by a clip (34) that is mounted on the caliper bracket (12), is bent rearwardly from the clip (34), extends rearwardly after passing an area above the brake caliper (3), is further bent upwardly, and is arranged on an upper side of the vehicle together with the brake hose (18).

According to an embodiment of the present invention, the brake disc thermally expands due to special braking so that the pulsar ring is pulled radially outwardly in a state where the brake disc and the pulsar ring are rigidly mounted on the wheel by fastening the brake disc and the pulsar ring together, the seat portion of the pulsar ring mounting portion and the portion to be detected are arranged on the same plane. Thus, the deformation such as twisting of the portion to be detected can be suppressed as much as possible.

Accordingly, the positional relationship between the portion to be detected and the sensor body portion is hardly largely changed. Thus, the predetermined distance between the portion to be detected of the pulsar ring and the sensor body portion can be easily maintained even under a rigid mount state.

According to an embodiment of the present invention, the rib is integrally formed on the portion to be detected of the pulsar ring by bending the outer-peripheral-side edge portion of the portion to be detected. Thus, the brake disc is arranged outside the pulsar ring and the rib is arranged on an outer peripheral side of the portion to be detected. Due to such a construction, at the time of mounting the pulsar ring, the rib structure is formed between a fastening portion of the pulsar ring mounting portion fastened to the wheel and the portion to be detected so that the rigidity of the portion to be detected is increased. Accordingly, even when the portion to be detected is pulled in the radially outward direction from the fastening portion of the pulsar ring mounting portion fastened to the wheel, a deformation amount of the pulsar ring can be made small so that the predetermined distance between the portion to be detected of the pulsar ring and the sensor body portion can be easily maintained.

Further, even when an external force is applied to the pulsar ring, the pulsar ring is hardly deformed.

According to an embodiment of the present invention, the fastening member that fastens the pulsar ring mounting portion and the brake disc mounting portion together in a state where the pulsar ring mounting portion and the brake disc mounting portion overlap with each other has the head portion thereof projected outwardly in the vehicle widthwise direction. Accordingly, in the constitution where a part of the brake disc mounting portion and a part of the pulsar ring mounting portion overlap with the caliper bracket, it is necessary to take into consideration such that the head portion of the fastening member does not interfere with the carrier bracket in the vehicle widthwise direction as viewed in a side view at the time of rotation.

However, the brake disc mounting portion is provided by forming the accommodating recessed portion that corresponds to the seat portion of the pulsar ring mounting portion on the brake disc. Thus, the seat portion of the pulsar ring mounting portion is accommodated in the accommodating recessed portion when the seat portion overlaps with the brake disc mounting portion. Due to such a construction, when the pulsar ring mounting portion and the brake disc mounting portion are fastened together by the fastening member, a projection amount of the head portion of the fastening member in the vehicle widthwise direction can be made small so that a clearance between the caliper bracket and the fastening member can be easily ensured.

According to an embodiment of the present invention, the accommodating recessed portion that constitutes the brake disc mounting portion is opened toward the pulsar ring side. Accordingly, in making the seat portion of the pulsar ring mounting portion overlap with the brake disc mounting portion, even when the pulsar ring mounting portion has a planar shape, the pulsar ring mounting portion can be made to overlap with the brake disc mounting portion without being bent. Accordingly, the pulsar ring mounting portion and the portion to be detected of the pulsar ring can be easily arranged on the same plane.

According to an embodiment of the present invention, the sensor body portion of the wheel speed sensor is arranged between the fork and the brake caliper and the sensor cable is arranged inside the brake caliper in the vehicle widthwise direction. Accordingly, the wheel sensor can be protected by the brake caliper and the fork. Further, the sensor cable does not project outwardly from the brake caliper. Thus, the sensor cable is hardly caught by an obstacle. Still further, the sensor cable extends upwardly together with the brake hose having a relatively large diameter. Thus, the wobbling of the sensor cable can be made small.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings that are given by way of illustration only, and thus are not limitative of the present invention, and wherein.

DETAILED DESCRIPTION OF THE PREFERRED EMBODIMENTS

Figure 1:
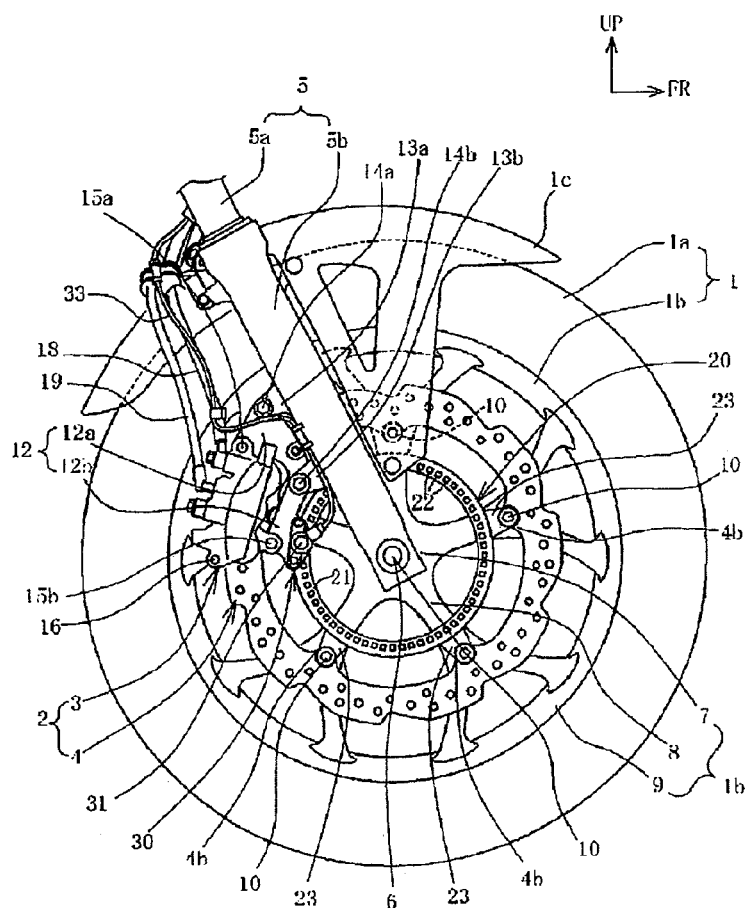
FIG. 1 is a right side view relating to a front wheel portion of a motorcycle according to an embodiment.

Hereinafter, an embodiment where the present invention is applied to a front wheel of a motorcycle that is one example of a saddle-ride-type vehicle is explained in conjunction with the drawings. In the explanation made hereinafter, the front and rear directions, the left and right directions and the like are identical with the directions of a vehicle that is explained hereinafter unless otherwise specified. Further, in the drawings used for the explanation made hereinafter, a front side of the vehicle is indicated by an arrow FR, a right side of the vehicle is indicated by an arrow LH, and an upper side of the vehicle is indicated by an arrow UP at proper positions respectively. A vehicle widthwise direction is equal to the lateral direction of the vehicle in meaning. Further, "inside" means that a target portion is positioned on a side closer to the center of the vehicle than a portion that becomes the reference, and "outside" means a side opposite to "inside."

Figure 2:
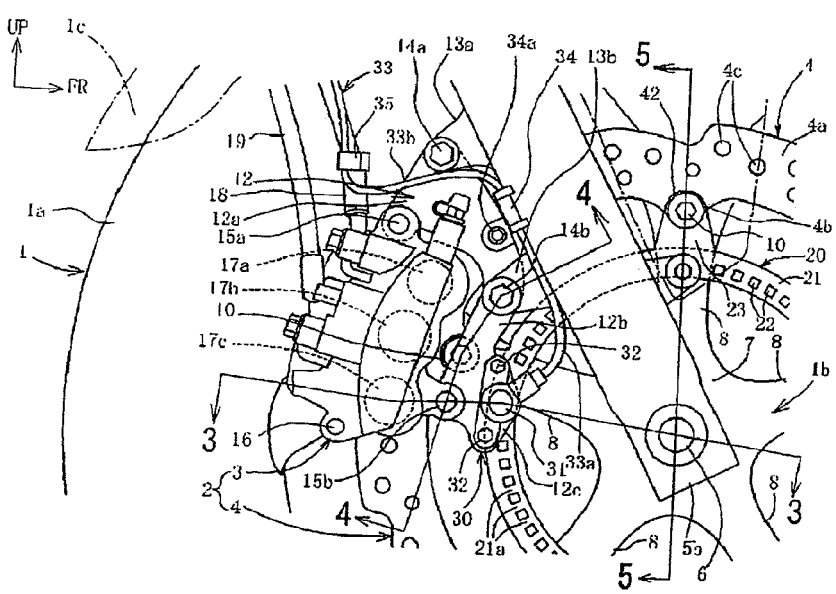
FIG. 2 is an enlarged view of a brake portion shown in FIG. 1.

The schematic constitution relating to a front wheel of a motorcycle and portions around the front wheel is explained mainly in conjunction with FIG. 1 and FIG. 2. FIG. 1 is a right side view showing a front wheel 1, and FIG. 2 is a view showing a front wheel brake 2 in an enlarged manner. In FIGS. 1 and 2, the front wheel brake 2 is a disc brake that includes a brake caliper 3 and a brake disc 4, and the brake caliper 3 is mounted on a front fork 5. The brake disc 4 is rotated integrally with a wheel 1b, and the brake caliper 3 applies braking to a braking portion 4a of the brake disc 4.

Front forks 5 are provided as a left and right pair, and each front fork 5 has the telescopic structure consisting of an inner tube 5a and an outer tube 5b. In this embodiment, the front fork 5 is an erection-type front fork where the outer tube 5b is positioned below the inner tube 5a. The front fork 5 may be an inverted-type front fork where an inner tube and an outer tube are arranged upside down.

The front wheel 1 is arranged between the left and right front forks 5, and is rotatably supported on an axle 6 that is supported between lower end portions of the left and right outer tubes 5b.

Although not shown in the drawing, upper portions of the front forks 5 are rotatably supported on a vehicle body, and are rotated by a steering handle.

The front wheel 1 is constituted of a tire 1a and the wheel 1b that supports the tire 1a. Symbol 1c indicates a front fender. The front fender 1c is supported on the outer tubes 5b and covers the front wheel 1 from above. In FIG. 2, the front fender 1c is omitted.

The wheel 1b is constituted of a hub 7, spokes 8 and a rim 9, and is a cast wheel manufactured by integrally forming these parts by casting or the like.

The hub 7 constitutes a center portion of the wheel 1b and is a portion that supports the axle 6 in a state where the axle 6 penetrates the hub 7 in the vehicle widthwise direction. The plurality of (five in this embodiment) spokes 8 extend outward in the radial direction from the hub 7, and extending ends of the spokes 8 are connected to an inner peripheral portion of the rim 9. The spoke 8 is bifurcated at a radially outer side thereof close to the rim 9 thus forming an approximately Y shape as viewed in a side view. The tire 1a is mounted on an outer peripheral side of the rim 9.

To a vehicle-body right side surface of the wheel 1b, the brake disc 4 and a pulsar ring 20 are fastened together to a mounting boss (described later) for the spokes 8 using a bolt 10. The brake disc 4 is arranged concentrically with the wheel 1b, and is positioned at an intermediate portion between the axle 6 and the rim 9 in the radial direction. The pulsar ring 20 constitutes, together with a sensor body portion 31 arranged in the vicinity of the brake caliper 3, a wheel speed sensor 30. The wheel speed sensor 30 generates pulse signals corresponding to a rotational speed of the wheel 1b for detecting a wheel speed. The detail of the wheel speed sensor 30 is described later.

Figure 6:
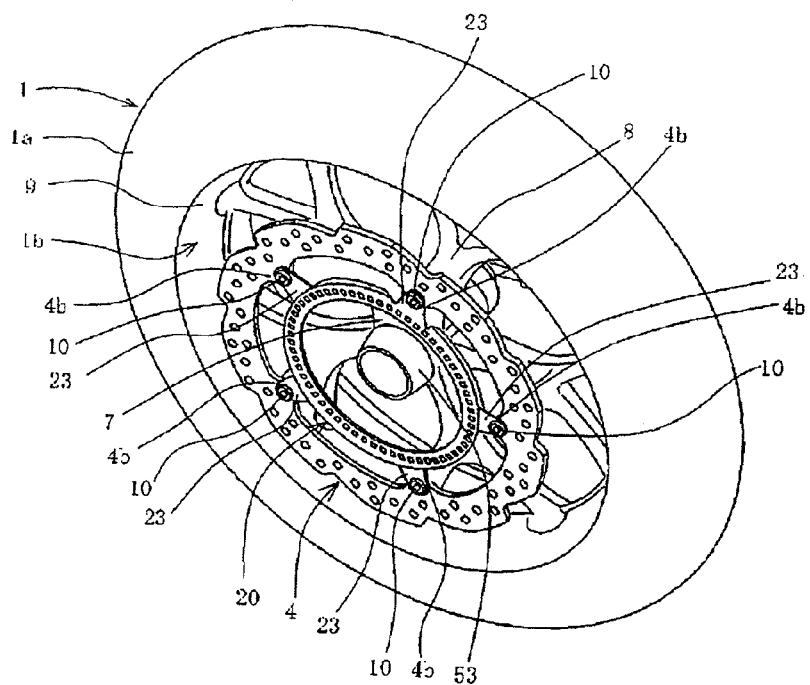
FIG. 6 is a perspective view of a front wheel in a state where a brake disc and a pulsar ring are mounted on the front wheel.

As shown in FIG. 6 that is a perspective view showing a state where the brake disc 4 and the pulsar ring 20 are assembled to the wheel 1b in a rigid mount by fastening the brake disc 4 and the pulsar ring 20 together to the wheel 1b, the pulsar ring 20 is a member that is arranged radially inside the brake disc 4 and concentrically with the brake disc 4. The pulsar ring 20 includes a ring-shaped portion 21 to be detected that has a diameter smaller than a diameter of the brake disc 4 and a plurality of (five in this embodiment) pulsar ring mounting portions 23 that project outwardly in the radial direction from an outer peripheral portion of the portion 21 to be detected.

The pulsar ring mounting portions 23 are overlapped with outer sides of brake disc mounting portions 4b that are formed on an inner peripheral portion of the brake disc 4. The pulsar ring mounting portions 23 and the brake disc mounting portions 4b are fastened together to the brake disc 4 using bolts 10.

Figure 5:
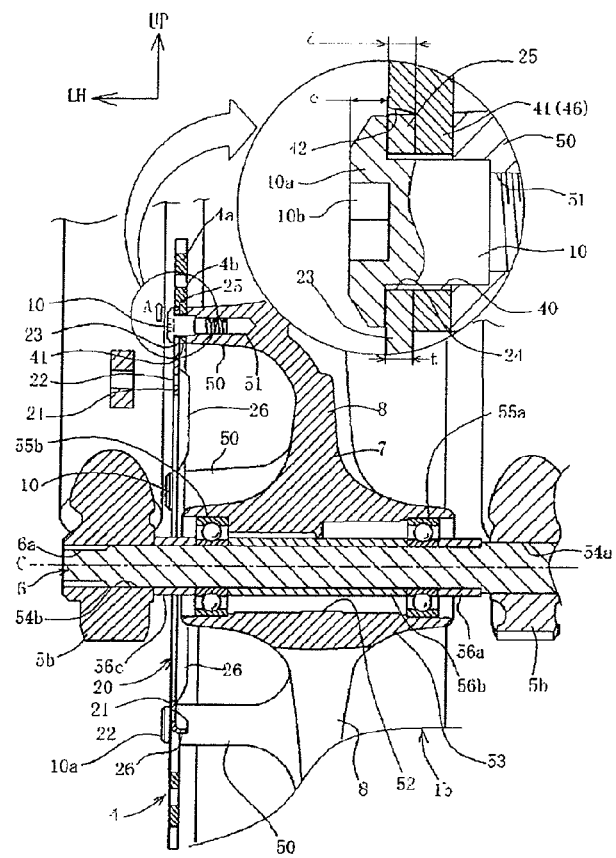
FIG. 5 is a cross-sectional view taken along a line 5-5 in FIG. 2.

As shown in FIG. 5, a mounting boss 50 is integrally formed on an intermediate portion of each spoke 8 in the radial direction in a projecting manner toward a right side of the vehicle body in the vehicle widthwise direction. A female threaded hole 51 that extends inwardly in the vehicle widthwise direction from a projecting end of the mounting boss 50 is formed in the mounting boss 50. The brake disc 4 and the pulsar ring 20 are fixed together to the boss 50 by fastening using the bolts 10.

The spoke 8 having an approximately Y shape includes a bifurcated portion where the spoke 8 is bifurcated in the radially outward direction and a single body portion where the spoke 8 is not bifurcated, and the mounting boss 50 is formed on the single body portion at a position close to a bifurcating starting portion. The plurality of (five in this embodiment) mounting bosses 50 are formed on a side surface of the wheel 1b in a state where the mounting bosses 50 are arranged on the same circle.

The bolt 10 has, as shown in an enlarged view, a head portion 10a that is formed into a relatively flat shape with a thickness e. Further, a working tool hole (hexagonal hole) 10b is formed in the head portion 10a.

On a center portion of the hub 7, an axle holder portion 53 is formed wherein an axle hole 52 is formed in a penetrating manner in the vehicle widthwise direction. The axle 6 is made to pass through the axle hole 52 from one side to the other side. The axle 6 is made to pass through a through hole 54a formed in one of a pair of left and right outer tubes 5b (the outer tube on a left side of the vehicle in this embodiment) preliminarily, is inserted into the axle hole 52 and, further, is made to pass through the axle hole 52. A male threaded portion 6a is formed on a distal end portion of the axle 6 and projects to the other side of the axle hole 52 and is inserted into a through hole 54b formed in the other tube 5b (the outer tube on a right side of the vehicle in this embodiment) and, further, is fastened to a female threaded portion formed in the through hole 54b.

The axle 6 is pivotally supported by a pair of left and right ball bearings 55a, 55b in the inside of the axle holder portion 53. The respective ball bearings 55a, 55b are positioned by collars 56a, 56b and 56c.

As shown in FIG. 2 in detail, the brake caliper 3 is mounted on the outer tube 5b (front fork 5) by way of a caliper bracket 12 having an approximately L shape as viewed in a side view. The brake disc mounting portion 4b and the pulsar ring mounting portion 23 are, as can be clearly understood from a position of the bolt 10 that is a member for fastening these mounting portions together, respectively arranged at a position where a part of the brake disc mounting portion 4b and a part of the pulsar ring mounting portion 23 overlap with an inner side of the caliper bracket 12 as viewed in a side view at the time of rotation.

Two mounting portions 13a, 13b are integrally formed on a vehicle-body rear side surface of the outer tube 5b in a projecting manner in the oblique downward and rearward direction in a vertically spaced-apart manner from each other. The caliper bracket 12 is mounted on respective inner sides of two mounting portions 13a, 13b in an overlapping manner.

The caliper bracket 12 includes, as integral parts thereof, an upper portion 12a that extends in the vertical direction approximately along a vehicle-body rear side surface of the outer tube 5b and a lower portion 12b that is bent from a lower part of the upper portion 12a and extends in the oblique and downward and rearward direction on a front side of the brake caliper 3. The upper portion 12a has an upper end portion thereof fastened to the mounting portion 13a using a bolt 14a, and has a lower end portion thereof that is contiguously formed with the lower portion 12b in a bent manner fastened to the mounting portion 13b using a bolt 14b.

The brake caliper 3 is a pin-slide-type brake caliper. The brake caliper 3 is supported on the upper portion 12a of the caliper bracket 12 by a main pin 15a, and is supported on the lower portion 12b by a slide pin 15b. The brake caliper 3 is slidably movable in the axial direction of the slide pin 15b. A hanger pin 16 is provided for supporting a brake pad (described later).

The brake caliper 3 of this embodiment is a three-pot-type brake caliper having three pistons 17a, 17b and 17c used for an ABS and a CBS (front and rear interlocking brake system). The front and rear pistons 17a and 17c are operated by a liquid pressure through a brake hose 18 connected to a front-wheel ABS. The center piston 17b is operated by a liquid pressure through a brake hose 19 that is connected to the ABS and the CBS.

The brake hose 18 is a liquid pressure passage that is in communication with a master cylinder (not shown in the drawing) that is interlockingly operated with a brake lever (not shown in the drawing) by way of the ABS, while the brake hose 19 is a liquid pressure passage that is communicated with a master cylinder (not shown in the drawing) that is interlockingly operated with a brake pedal (not shown in the drawing) by way of the CBS. These liquid pressure passages of two systems are connected to the brake caliper 3, and are communicated with different liquid chambers (described later) formed in the inside of the brake caliper 3; respectively. In each liquid chamber, a piston that corresponds to the liquid chamber is arranged in a state where the piston faces the liquid chamber, and an operating liquid in each liquid pressure passage is supplied to the corresponding liquid chamber. Thus, the respective pistons can be operated individually.

On a portion of the lower portion 12b of the caliper bracket 12 close to the slide pin 15b, an enlarged width portion 12c that projects toward the center of the wheel 1b is formed. The sensor body portion 31 is mounted on the enlarged width portion 12c using a bolt 32. The sensor body portion 31 is arranged in an overlapping manner with an outer side of the portion 21 to be detected of the pulsar ring 20 with a predetermined distance therebetween.

Pulse signals generated in the sensor body portion 31 are transmitted to a controller (not shown in the drawing) through a sensor cable 33 that constitutes a signal transmitting electric wire cord so that a wheel speed is calculated based on the pulse signals.

The sensor cable 33 extends toward the outer tube 5b from the sensor body portion 31 inside the pulsar ring 20, is bent upwardly and extends upwardly approximately along a vehicle-body rear side surface of the outer tube 5b, and is positioned on the vehicle-body rear side surface of the outer tube 5b by a clip 34. The clip 34 is fixed to a vertically intermediate portion of a front edge portion of the upper portion 12a of the caliper bracket 12 using a bolt 34a.

The sensor cable 33 further extends upwardly from the clip 34, is bent rearwardly above the clip 34, extends approximately horizontally, overlaps with the brake hose 18 from above, is bent upwardly again, and is fixed together with the brake hose 18 by a clip 35. Further, the sensor cable 33 extends upwardly approximately along the brake hose 18 while substantially overlapping with the brake hose 18.

Figure 4:
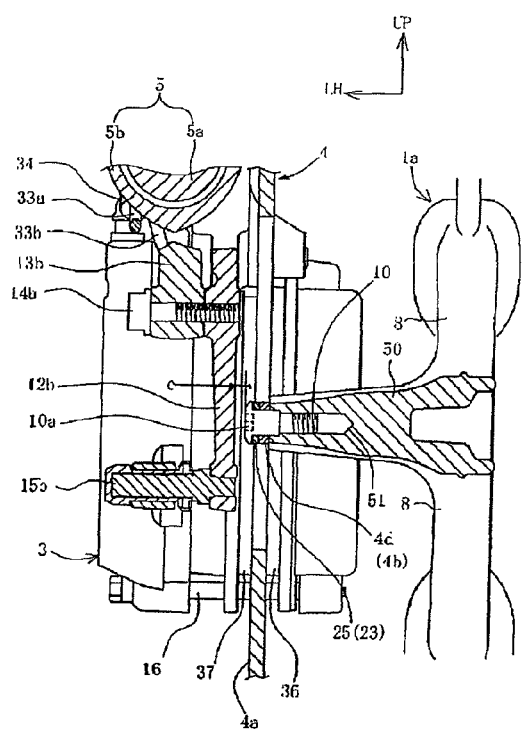
FIG. 4 is a cross-sectional view taken along a line 4-4 in FIG. 2.

As shown in FIG. 4, with respect to the sensor cable 33, a portion 33a of the sensor cable 33 below the clip 34 is arranged inside the brake caliper 3 in the vehicle widthwise direction between the brake caliper 3 and the front fork 5. A portion of the clip 34 that fixes the sensor cable 33 is also positioned inside the brake caliper 3 in the vehicle widthwise direction.

Further, a portion 33b of the sensor cable 33 above the clip 34 is arranged inside the brake caliper 3 in the vehicle widthwise direction.

Due to such a construction, it is possible to prevent the sensor cable 33 from projecting in the outward direction of the vehicle (in the outward direction of the vehicle widthwise direction) from the brake caliper 3 so that the sensor cable 33 is not damaged.

Further, the sensor cable 33 is integrally fixed with the brake hose 18 having a relatively large diameter by the clip 35. Thus, it is possible to decrease the wobbling of the sensor cable 33. Here, the brake hoses 18, 19 are configured to be deformed by deflection in the vertical direction corresponding to the movement of the front wheel 1 in the vertical direction or the like.

Figure 3:
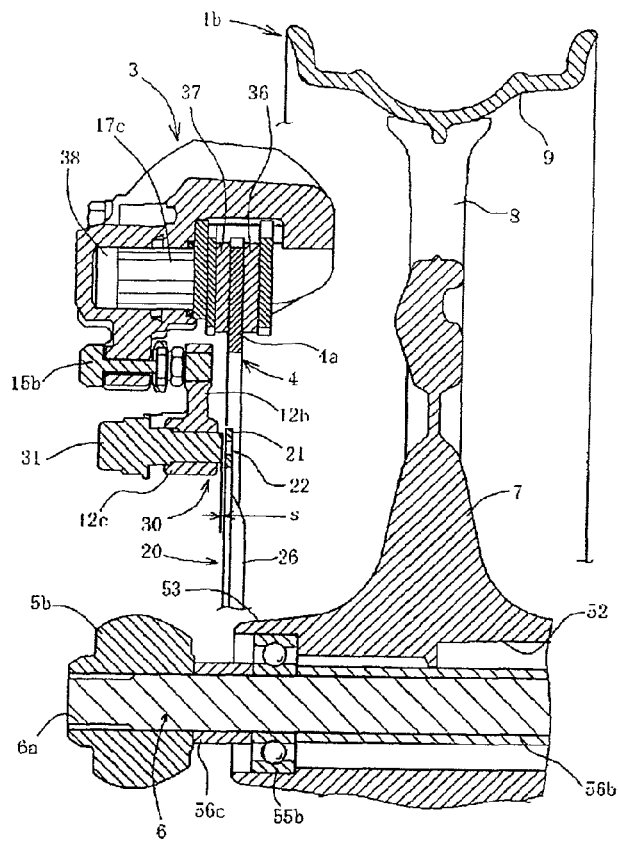
FIG. 3 is a cross-sectional view taken along a line 3-3 in FIG. 2.

Next, the front wheel brake 2 is explained in detail. In FIG. 3 and FIG. 4, the brake caliper 3 includes an inner fixed pad 36 that pushes an inner surface of a braking portion 4a of the brake disc 4, and an outer movable pad 37 that pushes an outer surface of the braking portion 4a. The outer movable pad 37 is movable in the direction that the outer movable pad 37 approaches to or retracts from the brake disc 4 due to pushing of the piston 17c. A liquid chamber 38 is formed between the piston 17c and a wall portion of a piston accommodating chamber that is formed in the brake caliper 3.

An operating liquid is supplied to the liquid chamber 38 from the brake hose 18 (see FIG. 2). When a liquid pressure becomes high, the piston 17c is pushed out in the direction toward the brake disc 4 thus pushing the outer movable pad 37 to the braking portion 4a, and also the brake caliper 3 moves toward the outside of the vehicle body along the slide pin 15b (15a) due to a liquid pressure in the liquid chamber 38. Thus, the inner fixed pad 36 is also pushed to the braking portion 4a of the brake disc 4.

As a result, the inner fixed pad 36 and the outer movable pad 37 are pushed to both surfaces of the braking portion 4a of the brake disc 4 respectively so that the brake caliper 3 clamps the braking portion 4a of the brake disc 4 and thereby the braking is performed.

The same goes for other pistons 17a, 17b not shown in FIG. 3, and the liquid chamber 38 is provided for every piston.

Figure 7:
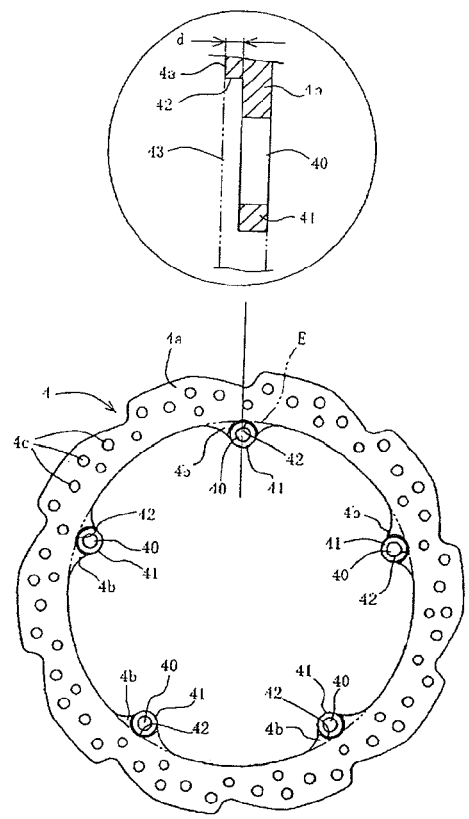
FIG. 7 is a front view of the brake disc (a face of the brake disc that faces a right side of a vehicle body in a state where the brake disc is mounted on the vehicle body being set as a front face)

As shown in FIG. 7, the brake disc 4 is arranged between the front fork 5 on a right side of the vehicle and the wheel 1b in a state where the brake disc 4 is parallel to a rotary surface formed of a side surface of the wheel 1b. The brake disc 4 includes, as integral parts thereof, the circular annular braking portion 4a and the brake disc mounting portions 4b that are formed on an inner peripheral side of the braking portion 4a.

A plurality of through holes 4c are formed in the braking portion 4a. Further, an outer shape of an outer peripheral portion of the braking portion 4a is changed in a wavy shape thus forming a wave disc.

Each brake disc mounting portion 4b is integrally formed on an inner peripheral side of the braking portion 4a in an approximately mountain shape in a state where the brake disc mounting portion 4b projects toward the center of the brake disc 4. The number of brake disc mounting portions 4b is equal to the number of mounting bosses 50, and the brake disc mounting portions 4b are arranged on the inner peripheral side of the brake disc 4 approximately equidistantly in the circumferential direction so as to overlap with the respective mounting bosses 50. Symbol E indicates an imaginary circle showing an inner periphery of the braking portion 4a, and each brake disc mounting portion 4b projects inwardly from the imaginary circle E.

A though hole 40 that allows the insertion of the bolt 10 therethrough is formed in each brake disc mounting portion 4b with a seat portion 41 being formed on a periphery of the through hole 40. A width of the seat portion 41 is set substantially equal to a width of the head portion 10a (see FIG. 4) of the bolt 10.

An enlarged portion in FIG. 7 shows a radial-directional cross section of the brake disc mounting portion 4b in an enlarged manner. As shown in the enlarged portion, the seat portion 41 is formed by counterboring such that a stepped portion 42 having a thickness obtained by subtracting a depth d from a wall thickness of the braking portion 4a is formed. The depth d is substantially equal to a plate thickness t (see FIG. 5) of the pulsar ring 20, and the seat portion 41 forms a thin wall portion compared to the braking portion 4a.

Further, a portion of the brake disc mounting portion 4b around the seat portion 41 forms a portion having the same wall thickness as the braking portion 4a. Accordingly, the seat portion 41 forms an accommodating recessed portion 43 that is lowered compared to the periphery of the seat portion 41 by an amount of the depth d, and the accommodating recessed portion 43 forms a recessed portion for accommodating the pulsar ring mounting portion 23.

While the stepped portion 42 is formed by counterboring such that the stepped portion 42 surrounds the seat portion 41, the stepped portion 42 does not surround the whole circumference of the seat portion 41. More specifically, the stepped portion 42 is formed into an approximately semicircular shape so as to surround a substantially half of the seat portion 41, or a braking-portion-4a-side portion of the seat portion 41 that is arranged on a radially outward side of the brake disc 4 with respect to the center of the seat portion 41.

The stepped portion 42 is not formed on a portion of the brake disc mounting portion 4b that is arranged on a radially outward side of the brake disc 4 with respect to the center of the seat portion 41. Accordingly, a portion of the seat portion 41 that is arranged on a radially inward side of the brake disc 4 with respect to the center of the seat portion 41 is not surrounded by the stepped portion 42. Thus, the accommodating recessed portion 43 formed by the stepped portion 42 forms a space opened toward a radially inward side of the brake disc 4 where the pulsar ring 20 is positioned.

By forming the accommodating recessed portion 43 as described above, the pulsar ring 20 can be arranged inside the brake disc 4, and a seat portion 25 of the pulsar ring mounting portion 23 that projects in the radially outward direction while having an approximately mountain shape and has a planar shape as a whole can be placed on the seat portion 41 of the brake disc mounting portion 4b in an overlapping manner from an inner peripheral side of the brake disc 4.

Next, the wheel speed sensor 30 is explained in detail. As shown in FIG. 3, the sensor body portion 31 is arranged to overlap with an outer side of the portion 21 to be detected of the pulsar ring 20 with a predetermined distance s therebetween.

The sensor body portion 31 includes a pick-up coil that generates pulse signals corresponding to a change in magnetic flux. Due to such a constitution, when the portion 21 to be detected is rotated integrally with the wheel 1b due to the rotation of the wheel 1b and detection holes 22 that are formed in the portion 21 to be detected equidistantly over the whole circumference in the circumferential direction and inter-hole portions 21a (see FIG. 8) each of which is a portion between neighboring detection holes 22 alternately pass an area immediately close to the sensor body portion 31, the pick-up coil of the sensor body portion 31 outputs pulse signal waves corresponding to a rotational speed of the wheel 1b corresponding to a change in magnetic flux.

Figure 8:
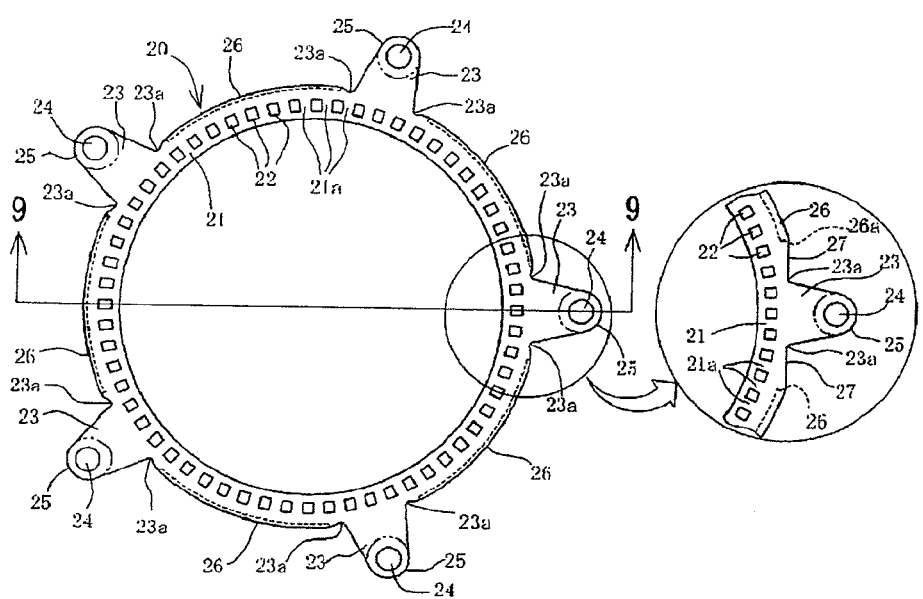
FIG. 8 is a front view of the pulsar ring (a face of the pulsar ring that faces the right side of the vehicle body in a state where the pulsar ring is mounted on the vehicle body being set as a front face)
Figure 10:
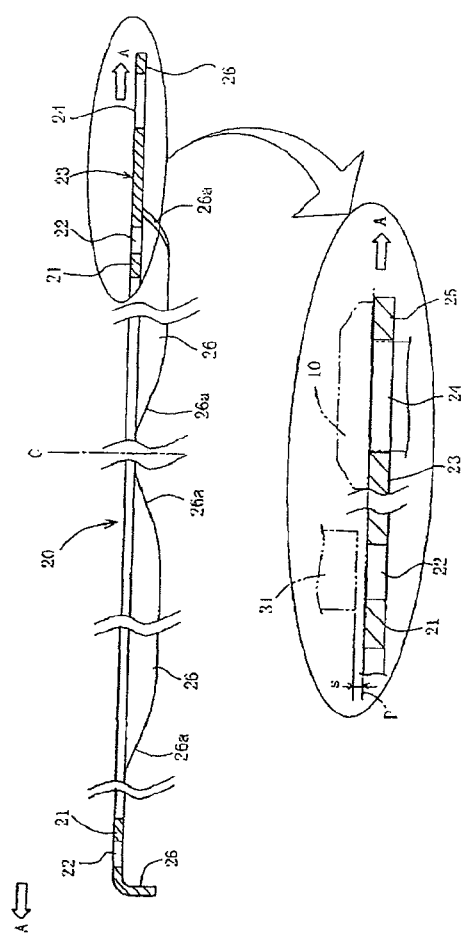
FIG. 10 is a cross-sectional view of a wheel according to a prior art.
Figure 9:
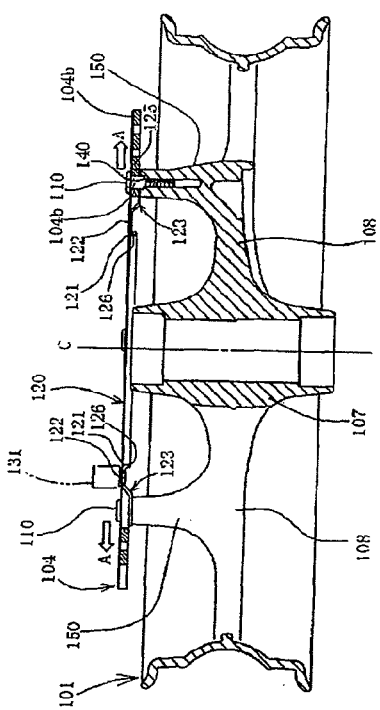
FIG. 9 is a cross-sectional view taken along a line 9-9 in FIG. 8.

As shown in FIGS. 8 and 9, the pulsar ring 20 is formed by press molding or the like using a ferromagnetic material such as a steel material, and is an integral body formed of the portion 21 to be detected and the pulsar ring mounting portions 23 that are formed on an outer peripheral portion of the portion 21 to be detected equidistantly in a projecting manner in the radially outward direction.

The number of pulsar ring mounting portions 23 is equal to the number of mounting bosses 50. In this embodiment, five pulsar ring mounting portions 23 are arranged to form a pentagram. A through hole 24 that allows the insertion of the bolt 10 therethrough is formed in a distal end portion of each pulsar ring mounting portion 23, and a seat portion 25 is formed on the periphery of the though hole 24.

The through hole 24 has substantially the same diameter as the through hole 40 that is formed in the brake disc mounting portion 4b of the brake disc 4.

The seat portion 25 is a portion indicated by an imaginary line in the drawing, is a portion that overlaps with the seat portion 41 of the brake disc mounting portion 4b, and has substantially the same width as the seat portion 41.

Ribs 26 are integrally formed on an outer peripheral side of the portion 21 to be detected. The rib 26 has a flange shape where the rib 26 is bent inwardly toward the center of rotation C (vehicle widthwise direction) at an approximately right angle. The ribs 26 are provided for enhancing the rigidity of the portion 21 to be detected thus making the portion 21 to be detected hardly twisted (see FIG. 9). The ribs 26 are not continuously formed over the whole circumference of the portion 21 to be detected and, as shown in FIG. 8, are formed discontinuously such that the rib 26 is formed between the neighboring pulsar ring mounting portions 23 but is not formed on a portion of the portion 21 to be detected where the pulsar ring mounting portion 23 is formed. Due to such a constitution, the portion 21 to be detected can be easily formed by molding. Even when the ribs 26 are formed discontinuously as described above, out of the outer peripheral portion of the portion 21 to be detected, the portions where the pulsar ring mounting portion 23 is formed have high rigidity due to the pulsar ring mounting portion 23. Thus, the rigidity of the portion 21 to be detected can be made uniform as a whole.

As shown in an enlarged portion in FIG. 8, a circumferential end portion 26a of the rib 26 and a proximal portion 23a that is a root portion of the pulsar ring mounting portion 23 are arranged with a distance therebetween, and the spaced-apart portion forms a shoulder portion 27 that connects the circumferential end portion 26a and the proximal portion 23a approximately linearly.

As shown in FIG. 9, the circumferential end portion 26a of the rib 26 has an inclined surface shape where the circumferential end portion 26a is inclined toward the shoulder portion 27, and a height of the rib 26 that is bent and projects toward the center of rotation C is gradually decreased toward the circumferential end portion. By changing the height of the rib 26 such that the height of the rib 26 is gradually lowered toward the pulsar ring mounting portion 23, it is possible to uniformly make the rigidity of the portion 21 to be detected obtained by the rib 26 and the rigidity of the portion 21 to be detected obtained by the pulsar ring mounting portion 23.

An enlarged portion in FIG. 9 shows a cross section of one pulsar ring mounting portion 23 in an enlarged manner. As can be clearly understood from the enlarged portion, an outer surface of the pulsar ring mounting portion 23 and an outer surface of the portion 21 to be detected form continuous planar surfaces that are positioned on the same plane P, and the pulsar ring mounting portion 23 per se also has a flat planar shape as a whole. Due to such a construction, the predetermined distance s is held between the outer surface of the portion 21 to be detected and the sensor body portion 31.

Although the through hole 24 may be formed of an annular hole shown in FIG. 8 and FIG. 9, the through hole 24 may be formed of a U-shaped groove, for example, where a portion (for example, a radially outer portion) of an annular shape is opened. By opening the portion of the annular shape as described above, it is possible to make the pulsar ring 20 further hardly influenced by the thermal deformation of the brake disc 4.

Next, the rigid mount structure of the brake disc 4 and the pulsar ring 20 is explained.

As shown in FIG. 4 and FIG. 5, the brake disc mounting portion 4b formed on the inner peripheral portion of the brake disc 4 is made to overlap with the distal end of the mounting boss 50 from a right outer side of the vehicle, the pulsar ring mounting portion 23 is made to overlap with the brake disc mounting portion 4b from the right outer side of the vehicle in the same manner, the respective through holes 24, 40 are aligned with the female threaded hole 51, and the bolt 10 is allowed to pass through the respective through holes 24, 40 and is fastened to the female threaded hole 51. Accordingly, the brake disc mounting portion 4b and the pulsar ring mounting portion 23 are rigidly mounted on the mounting boss 50 by fastening together.

In mounting the brake disc mounting portion 4b and the pulsar ring mounting portion 23 together by fastening, in advance, the brake disc mounting portion 4b is formed as the accommodating recessed portion 43 that is arranged one step lower than the outer surface of the braking portion 4a with a depth d that is substantially equal to a plate thickness t of the pulsar ring mounting portion 23. Accordingly, when the pulsar ring mounting portion 23 is made to overlap with the outer side of the brake disc mounting portion 4b, the pulsar ring mounting portion 23 is accommodated in the accommodating recessed portion 43. Further, the pulsar ring 20 is set such that the outer surface of the portion 21 to be detected and the outer surface of the pulsar ring mounting portion 23 are made coplanar with each other and hence, the portion 21 to be detected and the pulsar ring mounting portion 23 are made coplanar with an outer surface of the braking portion 4a of the brake disc 4 in a state where the brake disc mounting portion 4b and the pulsar ring mounting portion 23 are fastened together.

Further, the pulsar ring mounting portion 23 of the pulsar ring 20 has the planar surface that is continuous with the surface of the portion 21 to be detected, and the outer surface of the portion 21 to be detected is arranged close to the sensor body portion 31 that is arranged in the vicinity of the outer surface of the brake disc 4 with the predetermined distance s (FIG. 9).

Accordingly, the pulsar ring mounting portion 23 can be arranged, as the portion having the planar surface that is continuous with the surface of the portion 21 to be detected, on the same plane as the portion 21 to be detected without offsetting the portion 21 to be detected by bending the pulsar ring mounting portion 23 and thereby the pulsar ring 20 can be formed into a planar shape substantially as a whole (excluding the ribs 26).

It is necessary to arrange the sensor body portion 31 that is mounted on a lower portion 12b of the caliper bracket 12 relatively close to the portion 21 to be detected of the pulsar ring 20 for maintaining predetermined detection accuracy. In this embodiment, by arranging the outer surface of the portion 21 to be detected substantially coplanar with the outer surface of the brake disc 4, this embodiment can easily satisfy such a demand for the arrangement position of the sensor body portion 31.

Further, by making the pulsar ring mounting portion 23 overlap with the outer side of the brake disc mounting portion 4b, even when the pulsar ring 20 is formed into a planar shape as a whole such that the portion 21 to be detected and the pulsar ring mounting portion 23 are arranged on the same plane, this embodiment can easily satisfy the above-mentioned demand.

Further, since the head portion 10a of the bolt 10 of this embodiment is originally flattened, a height that the head portion 10a of the bolt 10 projects from an outer surface of the brake disc 4 is substantially equal to a thickness e (see FIG. 5) of the head portion 10a and thereby the projection height is made relatively small. Further, by forming a working tool hole 10b in the head portion 10a, the head portion 10a can be further flattened.

Accordingly, even when the head portion 10a is not embedded in the brake disc mounting portion 4b and the pulsar ring mounting portion 23, it is possible to provide a sufficient clearance c (FIG. 4) between the head portion 10a and the lower portion 12b of the caliper bracket 12 and hence, the head portion 10a does not impede the rotation of the wheel 1b.

As a result, the caliper bracket 12 can be arranged close to the brake disc 4 and hence, the brake caliper 3 can be miniaturized.

Further, the seat portion 41 is formed in the brake disc portion 4b by counterboring. Accordingly, compared to a case where the pulsar ring mounting portion 23 is simply overlapped with a brake disc mounting portion that has no such a seat portion formed by counterboring and a stepped portion is formed between respective outer surfaces of the pulsar ring mounting portion 23 and the brake disc mounting portion, an outward projecting height of the head portion 10a of the bolt 10 can be suppressed.

Next, the manner of operation of this embodiment is explained. In FIG. 5, when the brake disc 4 is raised to extremely high temperature under a special braking state so that the brake disc 4 bulges in the radially outward direction due to thermal deformation, the pulsar ring mounting portion 23 that is rigidly mounted on the mounting boss 50 of the wheel 1b by fastening together with the brake disc 4 is pulled in the radially outward direction (direction indicated by an arrow A) by way of the bolt 10.

Figure 11:
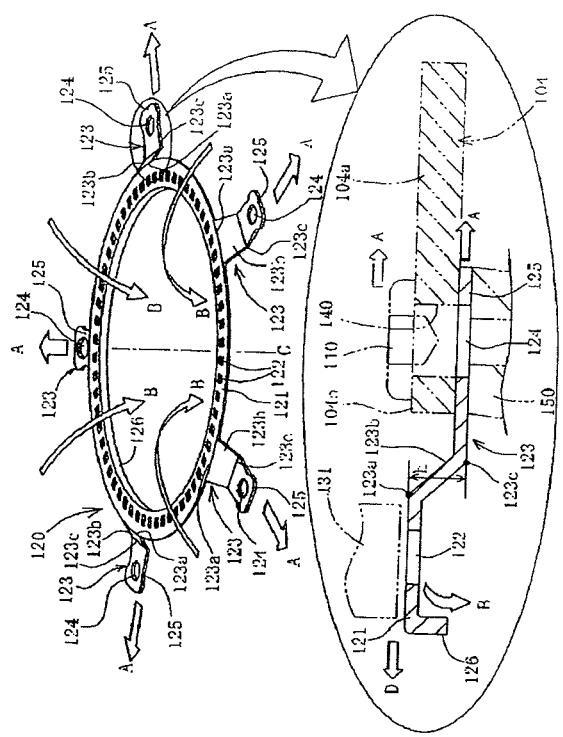
FIG. 11 is a perspective view and a view for explaining the manner of operation of a pulsar ring according to the prior art.

However, the pulsar ring mounting portion 23 is formed coplanar with the portion 21 to be detected thus forming the surface continuous with the portion 21 to be detected. Accordingly, as shown in FIG. 8, with respect to the pulsar ring 20, the portion 21 to be detected is only pulled in the radially outward direction uniformly by way of the respective pulsar ring mounting portions 23 that are arranged equidistantly in the circumferential direction on the same plane as the pulsar ring mounting portions 23. Therefore, the bending of pulsar ring mounting portions 123 with respect to a portion to be detected 121 due to inclined portions 123b and the twisting of the whole portion to be detected 121 based on the rigidity of a flange 126 formed on an inner peripheral side of the portion to be detected 121 shown in FIG. 11 are hardly generated.

Accordingly, even when the pulsar ring 20 is rigidly mounted by fastening together with the brake disc 4, the deformation of the portion 21 to be detected can be suppressed as much as possible and thereby the positional relationship between the portion 21 to be detected and the sensor body portion 31 can be maintained within a predetermined range. As a result, the detection accuracy of a wheel speed can be enhanced.

Further, by adopting the rigid mounting of the pulsar ring 20 and the brake disc 4 by fastening them together in place of floating mounting adopted in the prior art, the reduction of the number of parts and the reduction of cost can be realized.

Here, the accommodating recessed portion 43 having a depth d substantially equal to a plate thickness t of the pulsar ring mounting portion 23 is formed by forming the seat portion 41 on the brake disc mounting portion 4b by counterboring, and the accommodating recessed portion 43 is opened toward the inside in the radial direction that is a side where the pulsar ring 20 is positioned. Accordingly, by making the seat portion 25 of the pulsar ring mounting portion 23 overlap with the outer side of the seat portion 41 of the brake disc mounting portion 4b, the portion 21 to be detected that is arranged on the same plane as the pulsar ring mounting portion 23 can be arranged substantially coplanar with the brake disc 4.

For maintaining the predetermined detection accuracy, it is necessary that the sensor body portion 31 mounted on the lower portion 12b of the caliper bracket 12 is arranged relatively close to the portion 21 to be detected of the pulsar ring 20. In this embodiment, the outer surface of the portion 21 to be detected is arranged substantially coplanar with the outer surface of the brake disc 4 and hence, by setting the distal end of the sensor body portion 31 at the substantially same height as the outer surface of the brake disc 4 as viewed in a side view, a demand relating to the arrangement position of such a sensor body portion 31 can be easily satisfied.

Further, the seat portion 41 is formed in the brake disc portion 4b by counterboring. Accordingly, compared to a case where the pulsar ring mounting portion 23 is simply overlapped with a brake disc mounting portion that has no such seat portion by counterboring and a stepped portion is formed between respective outer surfaces of the pulsar ring mounting portion 23 and the brake disc mounting portion, an outward projecting height of the head portion 10a of the bolt 10 in the vehicle widthwise direction can be suppressed.

Further, by forming the ribs 26 on the outer peripheral portion of the portion 21 to be detected, the rigidity of the pulsar ring 20 can be enhanced as a whole thus making the portion 21 to be detected hardly deformed. Further, in fastening the pulsar ring 20, since each rib 26 is positioned between the seat portion 25 to that a tensile load generated by the thermal deformation of the brake disc 4 is inputted and the portion 21 to be detected, the deformation of the portion 21 to be detected with respect to the tensile load can be suppressed as much as possible.

Assume a case where the portion 21 to be detected and the pulsar ring mounting portion 23 are arranged on the same plane. In a case where a flange that constitutes the rib structure is formed on an inner peripheral side of the portion 21 to be detected as in the prior art shown in FIG. 11, when the pulsar ring mounting portions 23 are pulled in the radially outward direction so that the portion 21 to be detected is subject to the deformation in the diameter enlarging direction, the rigidity of the inner peripheral side of the portion 21 to be detected is increased due to the flange and hence, the rigidity becomes the resistance against the deformation of the portion 21 to be detected in the diameter enlarging direction so that forces directed in directions opposite to each other are applied to an inner peripheral side and an outer peripheral side of the portion 21 to be detected and thereby there exists a possibility that twisting is generated on the portion 21 to be detected.

When the portion 21 to be detected has a simple planar shape with no ribs 26, the possibility that the portion 21 to be detected is deformed by twisting is further increased.

However, by forming the ribs 26 on the outer peripheral side of the portion 21 to be detected, the generation of such twisting can be decreased, and the ribs 26 can enhance the rigidity of the portion 21 to be detected against the above-mentioned pulling.

Further, the ribs 26 are not continuously formed over the whole circumference and are discontinuously formed at portions where the pulsar ring mounting portions 23 are formed, and the circumferential end portion 26a of the rib 26 and the proximal portion 23a of the pulsar ring mounting portion 23 are arranged with the shoulder portion 27 interposed therebetween. Accordingly, by forming the ribs 26 on the portions of the portion 21 to be detected while avoiding the portions of the portion 21 to be detected having high rigidity due to the formation of the pulsar ring mounting portion 23, the portion 21 to be detected can acquire high rigidity and also the rigidity of the portion 21 to be detected can be made uniform by the ribs 26 and the pulsar ring mounting portions 23. Further, the ribs 26 are formed discontinuously at the portions where the pulsar ring mounting portions 23 are formed. Thus, the pulsar ring can be easily formed by press-molding or the like using a planar member, and the weight of the pulsar ring 20 can be reduced as a whole.

The present invention is not limited to the above-mentioned respective embodiments, and various modifications and applications are conceivable without departing from the principle of the present invention. For example, the detection holes may not be always formed in the pulsar ring, teeth portions may be formed equidistantly in the circumferential direction or minute magnetic poles may be arranged equidistantly in the circumferential direction. Further, the wheel speed sensor may be an optical sensor that does not detect a change in magnetic force generated by the rotation of the pulsar ring but detects reflection and transmitting of light.

Further, the pulsar ring 20 may have a diameter larger than a diameter of the brake disc 4 and may be arranged outside the brake disc 4. In this case, the brake disc mounting portions 4b are arranged on an outer peripheral side of the brake disc 4, the pulsar ring mounting portions 23 are arranged on the inner peripheral side of the pulsar ring 20, and the accommodating recessed portion that constitutes the seat portion 41 is opened in the radially outward direction.

Further, it is sufficient that the seat portions 25 of the pulsar ring mounting portion 23 and the portion 21 to be detected are arranged on the same plane. Accordingly, by bending an intermediate portion of the pulsar ring mounting portion 23 that is a portion between the proximal portion 23*a* and the seat portion 25, a tensile force that is generated in the radially outward direction at the time of thermal deformation of the brake disc 4 may be absorbed.

Further, a vehicle to that the present invention is applicable is not limited to a motorcycle, and may be also applicable to a two-wheeled to 4-wheeled saddle-ride-type vehicle and a scooter-type vehicle. Further, the present invention is not limited to the front wheel but is applicable to the rear wheel. When the present invention is applied to the rear wheel, the rear wheel is supported on a rear fork so that the brake disc and the pulsar ring are mounted on the wheel of the rear wheel, and the sensor body portion is mounted on the rear fork.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wheel speed sensor mounting structure comprising:
    a fork for rotatably supporting a wheel;
    a brake disc mounted on a side surface of the wheel in an integrally rotatable manner wherein braking is applied by a brake caliper; and
    a wheel speed sensor for detecting a rotational speed of the wheel, said wheel speed sensor including a pulsar ring rotatable integrally with the wheel and a sensor body portion arranged close to an annular portion to be detected and formed on the pulsar ring for generating pulse signals corresponding to a rotational speed of the pulsar ring;
    said pulsar ring is mounted on a wheel side and the sensor body portion is mounted on a fork side;
    said pulsar ring includes pulsar ring mounting portions projecting in a radially outward direction from the portion to be detected;
    said pulsar ring mounting portion being fastened to the side surface of the wheel together with a brake disc mounting portion formed on the brake disc using a fastening member in a state wherein the pulsar ring mounting portion overlaps with the brake disc mounting portion; and
    a seat portion, fastened by the fastening member, and the portion to be detected of the pulsar ring mounting portion are arranged on the same plane.

2. The pulsar ring mounting structure according to claim 1, wherein the pulsar ring includes, as an integral part thereof, a rib that is formed by bending an outer peripheral side edge portion of the portion to be detected along an outer periphery of the portion to be detected.

3. The pulsar ring mounting structure according to claim 1, wherein the structure includes a caliper bracket mounted on the fork for supporting the caliper;
    the brake disc mounting portion and the pulsar ring mounting portion being arranged at a position where the brake disc mounting portion and the pulsar ring mounting portion partially overlap with an inner side of the caliper bracket as viewed in a side view at the time of rotation respectively; and
    an accommodating recessed portion arranged one step lower than an outer surface of the braking portion, said accommodating recessed portion being formed on the brake disc mounting portion of the brake disc at a portion of the brake disc mounting portion that overlaps with the seat portion of the pulsar ring mounting portion, and the seat portion of the pulsar ring mounting portion is accommodated in the accommodating recessed portion.

4. The pulsar ring mounting structure according to claim 2, wherein the structure includes a caliper bracket mounted on the fork for supporting the caliper;
    the brake disc mounting portion and the pulsar ring mounting portion being arranged at a position where the brake disc mounting portion and the pulsar ring mounting portion partially overlap with an inner side of the caliper bracket as viewed in a side view at the time of rotation respectively; and
    an accommodating recessed portion arranged one step lower than an outer surface of the braking portion, said accommodating recessed portion being formed on the brake disc mounting portion of the brake disc at a portion of the brake disc mounting portion that overlaps with the seat portion of the pulsar ring mounting portion, and the seat portion of the pulsar ring mounting portion is accommodated in the accommodating recessed portion.

5. The pulsar ring mounting structure according to claim 3, wherein the accommodating recessed portion is formed by counterboring, and the accommodating recessed portion is opened toward a side where the pulsar ring is positioned.

6. The pulsar ring mounting structure according to claim 4, wherein the accommodating recessed portion is formed by counterboring, and the accommodating recessed portion is opened toward a side where the pulsar ring is positioned.

7. The pulsar ring mounting structure according to claim 1, wherein the structure includes a brake hose extending upwardly from the brake caliper behind the fork;
    the brake caliper being arranged behind the fork as viewed in a side view;
    the sensor body portion being arranged between the fork and the brake caliper; and
    a sensor cable connected to the sensor body portion extending upwardly inside the brake caliper in the vehicle widthwise direction from the sensor body portion along the fork, said sensor cable being supported by a clip that is mounted on the caliper bracket, is bent rearwardly from the clip, extends rearwardly after passing an area above the brake caliper, is further bent upwardly, and is arranged on an upper side of the vehicle together with the brake hose.

8. The pulsar ring mounting structure according to claim 2, wherein the structure includes a brake hose extending upwardly from the brake caliper behind the fork;
    the brake caliper being arranged behind the fork as viewed in a side view;
    the sensor body portion being arranged between the fork and the brake caliper; and
    a sensor cable connected to the sensor body portion extending upwardly inside the brake caliper in the vehicle widthwise direction from the sensor body portion along the fork, said sensor cable being supported by a clip that is mounted on the caliper bracket, is bent rearwardly from the clip, extends rearwardly after passing an area above the brake caliper, is further bent upwardly, and is arranged on an upper side of the vehicle together with the brake hose.

9. The pulsar ring mounting structure according to claim 3, wherein the structure includes a brake hose extending upwardly from the brake caliper behind the fork;
    the brake caliper being arranged behind the fork as viewed in a side view;
    the sensor body portion being arranged between the fork and the brake caliper; and a sensor cable connected to the sensor body portion extending upwardly inside the brake caliper in the vehicle widthwise direction from the sensor body portion along the fork, said sensor cable being supported by a clip that is mounted on the caliper bracket, is bent rearwardly from the clip, extends rearwardly after passing an area above the brake caliper, is further bent upwardly, and is arranged on an upper side of the vehicle together with the brake hose.

10. The pulsar ring mounting structure according to claim 5, wherein the structure includes a brake hose extending upwardly from the brake caliper behind the fork;
the brake caliper being arranged behind the fork as viewed in a side view;
the sensor body portion being arranged between the fork and the brake caliper; and
a sensor cable connected to the sensor body portion extending upwardly inside the brake caliper in the vehicle widthwise direction from the sensor body portion along the fork, said sensor cable being supported by a clip that is mounted on the caliper bracket, is bent rearwardly from the clip, extends rearwardly after passing an area above the brake caliper, is further bent upwardly, and is arranged on an upper side of the vehicle together with the brake hose.

11. A wheel speed sensor mounting structure comprising:
a brake disc mounted on a side surface of a wheel in an integrally rotatable manner wherein braking is applied by a brake caliper; and
a wheel speed sensor for detecting a rotational speed of the wheel, said wheel speed sensor including a pulsar ring rotatable integrally with the wheel and a sensor body portion arranged close to an annular portion to be detected and formed on the pulsar ring for generating pulse signals corresponding to a rotational speed of the pulsar ring;
said pulsar ring being mounted on a first side of the wheel and the sensor body portion being mounted on a second side of the wheel;
said pulsar ring includes pulsar ring mounting portions projecting in a radially outward direction from the portion to be detected;
said pulsar ring mounting portion being fastened to the first side of the wheel together with a brake disc mounting portion formed on the brake disc using a fastening member in a state wherein the pulsar ring mounting portion overlaps with the brake disc mounting portion; and
a seat portion, fastened by the fastening member, and the portion to be detected of the pulsar ring mounting portion are arranged on the same plane.

12. The pulsar ring mounting structure according to claim 11, wherein the pulsar ring includes, as an integral part thereof, a rib that is formed by bending an outer peripheral side edge portion of the portion to be detected along an outer periphery of the portion to be detected.

13. The pulsar ring mounting structure according to claim 11, wherein the structure includes a caliper bracket mounted on the fork for supporting the caliper;
the brake disc mounting portion and the pulsar ring mounting portion being arranged at a position where the brake disc mounting portion and the pulsar ring mounting portion partially overlap with an inner side of the caliper bracket as viewed in a side view at the time of rotation respectively; and
an accommodating recessed portion arranged one step lower than an outer surface of the braking portion, said accommodating recessed portion being formed on the brake disc mounting portion of the brake disc at a portion of the brake disc mounting portion that overlaps with the seat portion of the pulsar ring mounting portion, and the seat portion of the pulsar ring mounting portion is accommodated in the accommodating recessed portion.

14. The pulsar ring mounting structure according to claim 12, wherein the structure includes a caliper bracket mounted on the fork for supporting the caliper;
the brake disc mounting portion and the pulsar ring mounting portion being arranged at a position where the brake disc mounting portion and the pulsar ring mounting portion partially overlap with an inner side of the caliper bracket as viewed in a side view at the time of rotation respectively; and
an accommodating recessed portion arranged one step lower than an outer surface of the braking portion, said accommodating recessed portion being formed on the brake disc mounting portion of the brake disc at a portion of the brake disc mounting portion that overlaps with the seat portion of the pulsar ring mounting portion, and the seat portion of the pulsar ring mounting portion is accommodated in the accommodating recessed portion.

15. The pulsar ring mounting structure according to claim 13, wherein the accommodating recessed portion is formed by counterboring, and the accommodating recessed portion is opened toward a side where the pulsar ring is positioned.

16. The pulsar ring mounting structure according to claim 14, wherein the accommodating recessed portion is formed by counterboring, and the accommodating recessed portion is opened toward a side where the pulsar ring is positioned.

17. The pulsar ring mounting structure according to claim 11, wherein the structure includes a brake hose extending upwardly from the brake caliper behind the fork;
the brake caliper being arranged behind the fork as viewed in a side view;
the sensor body portion being arranged between the fork and the brake caliper; and
a sensor cable connected to the sensor body portion extending upwardly inside the brake caliper in the vehicle widthwise direction from the sensor body portion along the fork, said sensor cable being supported by a clip that is mounted on the caliper bracket, is bent rearwardly from the clip, extends rearwardly after passing an area above the brake caliper, is further bent upwardly, and is arranged on an upper side of the vehicle together with the brake hose.

18. The pulsar ring mounting structure according to claim 12, wherein the structure includes a brake hose extending upwardly from the brake caliper behind the fork;
the brake caliper being arranged behind the fork as viewed in a side view;
the sensor body portion being arranged between the fork and the brake caliper; and
a sensor cable connected to the sensor body portion extending upwardly inside the brake caliper in the vehicle widthwise direction from the sensor body portion along the fork, said sensor cable being supported by a clip that is mounted on the caliper bracket, is bent rearwardly from the clip, extends rearwardly after passing an area above the brake caliper, is further bent upwardly, and is arranged on an upper side of the vehicle together with the brake hose.

19. The pulsar ring mounting structure according to claim 13, wherein the structure includes a brake hose extending upwardly from the brake caliper behind the fork;
the brake caliper being arranged behind the fork as viewed in a side view;

the sensor body portion being arranged between the fork and the brake caliper; and a sensor cable connected to the sensor body portion extending upwardly inside the brake caliper in the vehicle widthwise direction from the sensor body portion along the fork, said sensor cable being supported by a clip that is mounted on the caliper bracket, is bent rearwardly from the clip, extends rearwardly after passing an area above the brake caliper, is further bent upwardly, and is arranged on an upper side of the vehicle together with the brake hose.

20. The pulsar ring mounting structure according to claim 15, wherein the structure includes a brake hose extending upwardly from the brake caliper behind the fork;

the brake caliper being arranged behind the fork as viewed in a side view;

the sensor body portion being arranged between the fork and the brake caliper; and a sensor cable connected to the sensor body portion extending upwardly inside the brake caliper in the vehicle widthwise direction from the sensor body portion along the fork, said sensor cable being supported by a clip that is mounted on the caliper bracket, is bent rearwardly from the clip, extends rearwardly after passing an area above the brake caliper, is further bent upwardly, and is arranged on an upper side of the vehicle together with the brake hose.

* * * * *

UNITED STATES PATENT AND TRADEMARK OFFICE
CERTIFICATE OF CORRECTION

| | | |
|---|---|---|
| PATENT NO. | : 8,444,164 B2 | Page 1 of 1 |
| APPLICATION NO. | : 13/543401 | |
| DATED | : May 21, 2013 | |
| INVENTOR(S) | : Keita Mikura et al. | |

It is certified that error appears in the above-identified patent and that said Letters Patent is hereby corrected as shown below:

ON THE TITLE PAGE:

Insert the following Foreign Application Priority Data, Item (30):

-- (30)     Foreign Application Priority Data

Jul. 31, 2011 (JP) .................... 2011-167898 --.

Signed and Sealed this
Sixth Day of August, 2013

Teresa Stanek Rea
*Acting Director of the United States Patent and Trademark Office*